Jan. 28, 1936.   G. W. SWAN   2,028,957
OSCILLATING CULTIVATOR
Filed Sept. 7, 1934   3 Sheets-Sheet 1
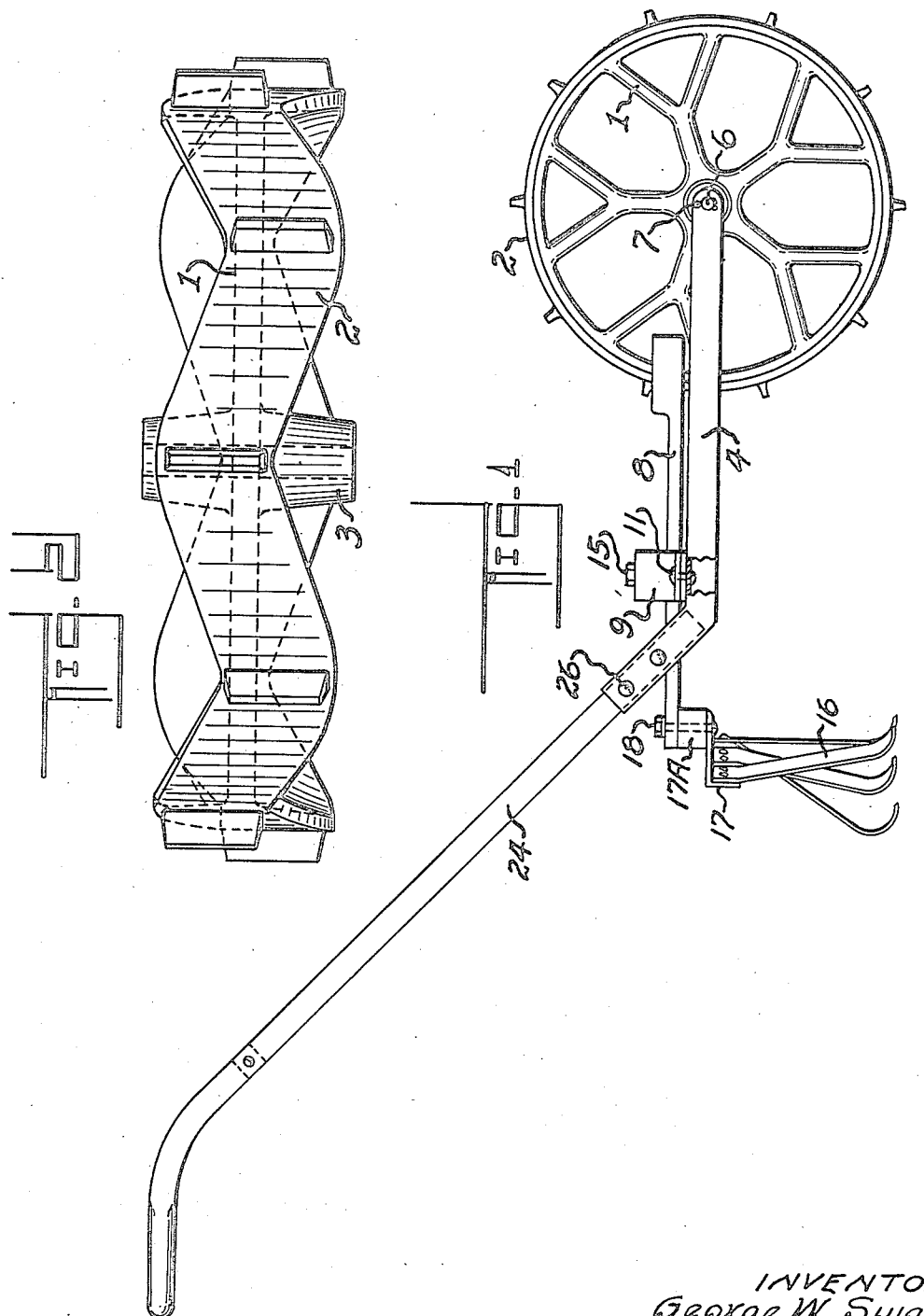
INVENTOR:
George W. Swan.
By Grover C. Hill,
Attorney.

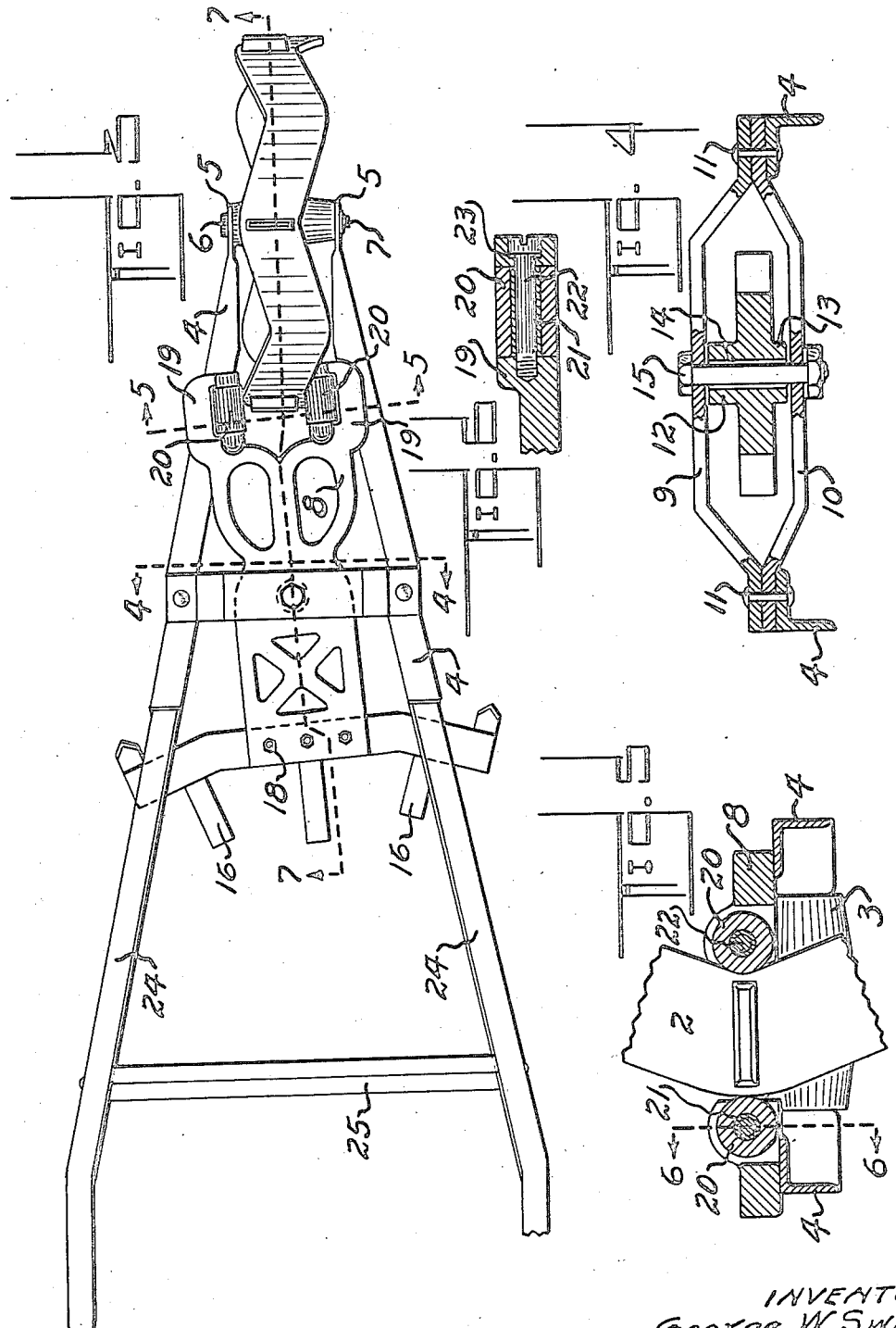

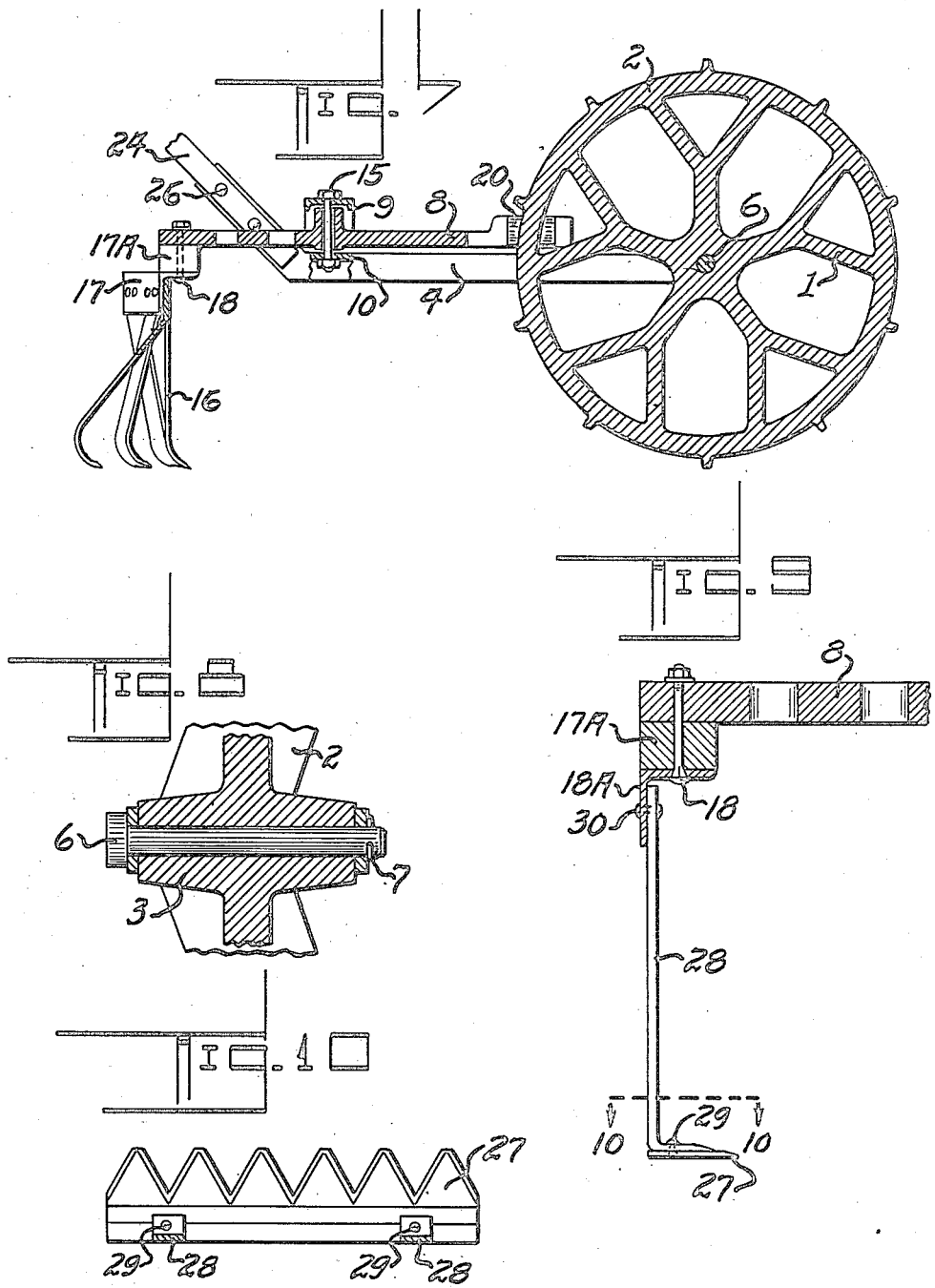

Patented Jan. 28, 1936

2,028,957

UNITED STATES PATENT OFFICE 2,028,957

OSCILLATING CULTIVATOR

George W. Swan, Flat Rock, Mich.

Application September 7, 1934, Serial No. 743,052

7 Claims. (Cl. 97—45)

This invention concerns the art of farm implements and has reference more directly to that branch of the art known as the garden implement or tool, and the principal object of the invention is to provide a cultivator that is of a new and original design and construction, and is arranged so that as the cultivator is operated by hand the prongs of the device will be continuously oscillated in a positive manner so as to greatly aid in breaking and pulverizing the ground upon which it is operated, and the result being that the value of cultivation by this method is greatly enhanced and thereby contributing much to the betterment of garden products in general.

Another advantage of the invention is that the principle thereof may be as advantageously applied to power driven cultivating machines for general farming purposes, whether the propulsion of the machine is by an animal, tractor or otherwise.

It will become early apparent that the invention possesses added advantages, particularly revealed during the course of the following detailed description, illustrated throughout the accompanying drawings, and more fully pointed out in the subjoined claims.

With reference to the drawings:

Figure 1 is a side elevation of the complete invention.

Figure 2 is a greatly enlarged top plan view of the wheel of the device.

Figure 3 is a top plan view of the complete invention.

Figure 4 is an enlarged sectional view taken directly upon line 4—4 of Figure 3.

Figure 5 is a greatly enlarged sectional view taken directly upon line 5—5 of Figure 3.

Figure 6 is a section taken upon line 6—6 of Figure 5.

Figure 7 is a longitudinal section taken upon line 7—7 of Figure 3.

Figure 8 is an enlarged section of the hub portion of the wheel of the device.

Figure 9 is a modified form showing the detachable cutting blade for the device.

Figure 10 is also a modified form taken upon line 10—10 of Figure 9.

The invention comprises a wheel of the desired diameter consistent with the purpose it is to serve and which may be of a suitable casted metal. This wheel has spoke arrangement 1 that is preferably of the formation as indicated and which is adapted to adequately support rim 2, and it is understood that hub 3 is provided as shown.

Elongated frame 4 is employed, the formation of which is clearly indicated in Figure 3 and the front end of said frame being formed as at 5 so as to accommodate pin 6, and said pin forming the axis for the wheel by virtue of hub 3 thereof, and it is understood that said pin is provided with a transversely extending aperture therethrough so as to accommodate cotter pin 7.

An important feature of the invention is the oscillating member 8 which is pivotally mounted upon frame 4 in the following manner:

With particular reference to Figure 4, it is clearly observed that upper cross member 9 and lower cross member 10 are provided, and are permanently secured to frame 4 by rivets 11 as indicated. Member 8 has upper hub portion 12 and lower hub portion 13 with opening 14 passing through said hub portions, and bolt 15 being adapted to engage said opening as shown and is supported by cross members 9 and 10 respectively, also the usual nut and lock washer being provided for said bolt. It is further understood that opening 14 is of a somewhat larger diameter than the diameter of said bolt so as to facilitate the oscillating motion of member 8 during the normal operation of the device.

A plurality of cultivating prongs 16 is provided and being permanently secured to angle bar 17, and said bar preferably formed as indicated in Figure 3 so as to give the desired effect. Bar 17 is detachably secured to the rear end of member 8 by means of bolts 18 where shown.

The front end of member 8 is enlarged and forming thereby oppositely disposed yoke portions 19 so as to accommodate hardened steel rollers 20 respectively, also bushing 21 as shown. Each of said rollers is adapted to rotate within yoke portion 19 by virtue of stud 22 which threadedly engages said portion with lock washer 23 where shown. It is further understood that said rollers are arranged to freely rotate within their respective yoke portions and either of said rollers being adapted to operatively engage rib 2 of the wheel of the device.

A pair of handles 24 is provided and being substantially braced by cross member 25 as shown, and it is seen that said handles are secured to frame 4 by rivets 26 where shown.

The complete details of construction of the invention having been previously explained, the operation and advantage thereof follows:—

The outstanding feature of the invention is the particular zigzag formation of rim 2, and by means of this formation it is understood that as the device is propelled the rotating of the wheel will naturally cause the rear end of member 8 to oscillate, and as prongs 16 are permanently fixed therewith they will be caused to oscillate simultaneously with said member and accordingly increase the pulverizing capacity of the device. It is of course understood that the presence of rollers 20 being rotatably mounted upon the front end of member 8 and being operatively in contact with rim 2 make this accomplishment readily possible and practical for the purpose.

Referring more particularly to Figures 9 and 10, which disclose a modified form of the invention, it is understood that cutting blade 27 is provided and is permanently secured to bars 28 by rivets 29, and said bars also being secured to bar 17 by rivets 30, and the purpose of blade 27 is for cutting weeds, small plants, roots and the like, or in other words the surface of the ground may be quickly and properly cleared before planting and during the cultivating stage of the plants.

It is now understood that in order to use blade 27, bar 17 with prongs 16 thereon is removed from member 8 by likewise removing bolts 18, thence bar 18A with said blade secured thereto is then secured to member 8 by said bolts, block 17A is used for this purpose similar to the connection of prongs 16 to said member.

Still another advantage of the invention, and one not to be overlooked, is that due to the simple operation thereof anyone may accomplish very successful work for this purpose and thereby minimize the energy required for the work.

While in conclusion it is understood that a single embodiment of the invention is hereinabove set forth, the same would anticipate certain modification in the details of construction, or of the design thereof, if this condition should present itself during any probable further development of the invention for the market, however in any eventuality a departure from the general principle would be consistently avoided.

Having thus described my invention, what I claim as new is:

1. In an oscillating cultivator, an elongated frame, a ground engaging wheel detachably secured in the forward end of said frame, said wheel having a rim formed in a zigzag course extending completely around the circumference of the same, an oscillating member, a cross member secured to the top of said frame, an additional cross member secured to the bottom of said frame, both of said cross members disposed in alignment relative to each other, the aforesaid oscillating member being supported between said cross members and being adapted to pivot and oscillate in relation to said cross members, a pair of rollers journaled within the forward end of the oscillating member, either of said rollers adapted to contact the aforesaid zigzag wheel rim so that as said wheel is rotated during the normal operation of the device, said rim will simultaneously oscillate the aforesaid oscillating member, ground working implements carried by the rear end of said oscillating member.

2. In an oscillating cultivator, an elongated frame, a carrier wheel journaled within the forward end of said frame, a zigzag rim for said wheel, an oscillating member pivotally mounted upon the top of said frame, means operatively secured to the forward end of said member and in normal contact with said zigzag rim so that when aforesaid wheel is rotated said member will be simultaneously oscillated, a pair of depending cultivator prongs, and means for detachably securing the same to the rear end of said member, so that said prongs will likewise be adapted to oscillate simultaneously with the member aforesaid.

3. In an oscillating cultivator, an elongated frame, a ground engaging wheel operatively secured in the forward end of said frame, an oscillating member pivotally mounted upon the top of said frame, a plurality of depending cultivator prongs secured to the rear end of said member, and means upon the aforesaid wheel contacting with means upon the forward portion of said member whereby during the normal operation of the device the rotating action of said wheel will oscillate the aforesaid member and likewise the aforesaid prongs thereon.

4. In an oscillating cultivator, an elongated frame, a ground engaging wheel mounted in the forward end of the frame, an oscillating member, means for pivotally mounting said member upon said frame, associated means upon said wheel and upon said member whereby when the wheel is rotated during the normal operation of the device said member will be oscillated, a plurality of cultivator prongs, means for detachably securing the same to the rear end of the aforesaid oscillating member, and handle means for the rear portion of the elongated frame aforesaid.

5. In a cultivator, a frame, a ground engaging wheel mounted in the forward end of said frame, said wheel including a rim having undulated edges, a horizontally disposed oscillatory member mounted on the frame rearwardly of the wheel, ground working implements depending from the rear end of the oscillatory member, the forward end of said member terminating in a yoke, the arms of which are disposed on opposite sides of the wheel, and means carried by the arms coacting with the undulated edges of the rim for causing the member and the ground working implements to oscillate as the wheel turns and the device moves over the ground.

6. In a cultivator, a frame, a ground engaging wheel mounted in the forward end of said frame, said wheel including a rim having undulated edges, a horizontally disposed oscillatory member mounted on the frame rearwardly of the wheel, ground working implements depending from the rear end of the oscillatory member, the forward end of said member terminating in a yoke, the arms of which are disposed on opposite sides of the wheel, and freely rotatable rollers mounted in the arms of the yoke and adapted to engage the undulated edges of the rim for causing the member and the ground working implements to oscillate as the wheel turns and the device moves over the ground.

7. In a cultivator, a frame including spaced side bars terminating at their ends in handle portions, a ground engaging wheel mounted between the forward ends of said bars, said wheel including a rim having undulated edges, upper and lower cross bars secured to the side bars at the intermediate portion of the frame, an oscillatory member mounted between the cross bars, cultivator prongs secured to the rear end of the oscillatory member, the forward end of the oscillatory member terminating in a yoke, the arms of the yoke being disposed on the opposite sides of the wheel, and rollers carried by the arms for engagement with the respective undulated edges of the rim for causing the member and the cultivator prongs carried thereby to oscillate as the wheel turns and the device moves over the ground.

GEORGE W. SWAN.